(12) United States Patent
Murakami et al.

(10) Patent No.: US 10,640,017 B2
(45) Date of Patent: May 5, 2020

(54) SEAT ROTATING DEVICE

(71) Applicant: SHIROKI CORPORATION, Fujisawa-shi, Kanagawa (JP)

(72) Inventors: Yuta Murakami, Nagoya (JP); Toshiaki Nagata, Aichi-ken (JP); Ryosuke Mizuno, Toyota (JP); Katsuya Nozue, Toyohashi (JP)

(73) Assignee: SHIROKI CORPORATION, Fujisawa-shi, Kanagawa (JP)

( * ) Notice: Subject to any disclaimer, the term of this patent is extended or adjusted under 35 U.S.C. 154(b) by 2 days.

(21) Appl. No.: 16/188,357

(22) Filed: Nov. 13, 2018

(65) Prior Publication Data
US 2019/0143849 A1 May 16, 2019

(30) Foreign Application Priority Data

Nov. 14, 2017 (JP) ................................ 2017-219538
Nov. 9, 2018 (JP) ................................ 2018-211645

(51) Int. Cl.
| | |
|---|---|
| *B60N 2/14* | (2006.01) |
| *B60N 2/02* | (2006.01) |
| *B60N 2/07* | (2006.01) |
| *B60N 2/08* | (2006.01) |

(52) U.S. Cl.
CPC ............. *B60N 2/14* (2013.01); *B60N 2/0232* (2013.01); *B60N 2/0705* (2013.01); *B60N 2/0735* (2013.01); *B60N 2/0818* (2013.01); *B60N 2002/0236* (2013.01)

(58) Field of Classification Search
CPC ...... B60N 2/14; B60N 2/0232; B60N 2/0705; B60N 2/7035
USPC ....................................... 297/344.21, 344.24
See application file for complete search history.

(56) References Cited

U.S. PATENT DOCUMENTS

| | | | | |
|---|---|---|---|---|
| 6,981,746 | B2 * | 1/2006 | Chung ..................... | B60N 2/14 |
| | | | | 297/344.24 |
| 7,219,961 | B2 * | 5/2007 | Priepke .................. | B60N 2/143 |
| | | | | 297/344.21 |
| 7,648,186 | B2 * | 1/2010 | Ukai ..................... | B60N 2/146 |
| | | | | 297/344.22 |
| 2009/0127908 | A1 * | 5/2009 | Kucharski ................ | B60N 2/14 |
| | | | | 297/344.24 |
| 2010/0052392 | A1 * | 3/2010 | Lung ....................... | B60N 2/14 |
| | | | | 297/344.24 |

FOREIGN PATENT DOCUMENTS

JP S63141841 A 6/1988

* cited by examiner

*Primary Examiner* — Anthony D Barfield
(74) *Attorney, Agent, or Firm* — Buchanan Ingersoll & Rooney PC

(57) ABSTRACT

A seat rotating device for a vehicle includes: a plate used to support a seat; and a pair of guide rails arranged side by side in a vehicle width direction and supporting the plate. The guide rails each have a fixed rail and a sliding member that supports the plate and is slidable along the fixed rail. The plate includes guides that guide each of the sliding members. The guides are configured such that the plate rotates while causing the sliding members to move in directions opposite to each other or the plate rotates based on movement of the sliding members in directions opposite to each other.

8 Claims, 12 Drawing Sheets

SEAT ROTATING DEVICE

BACKGROUND

The present disclosure relates to a seat rotating device mainly for a vehicle.

Japanese Laid-Open Patent Publication No. S63-141841 discloses a device that rotates a vehicle seat. The seat rotating device includes a rotation supporting shaft and an arc-shaped guide rail arranged around the rotation supporting shaft.

SUMMARY

According to an aspect of the present invention, a seat rotating device for a vehicle includes: a plate used to support a seat; and a pair of guide rails arranged side by side in a vehicle width direction and supporting the plate. The guide rails each have a fixed rail and a sliding member that supports the plate and is slidable along the fixed rail. The plate includes guides that guide each of the sliding members. The guides are configured such that the plate rotates while causing the sliding members to move in directions opposite to each other or the plate rotates based on movement of the sliding members in directions opposite to each other.

These and other aspects of the present invention will be more apparent from the following description, taken in conjunction with the accompanying drawings, illustrating by way of example the principles of the invention.

DETAILED DESCRIPTION

Hereinafter, embodiments of a seat and a seat rotating device attached to a vehicle will be described with reference to FIGS. 1 to 17.

A state in which a seat 1 attached to a vehicle together with a seat rotating device 5 is directed to a front side will be called a "reference position." Unless expressly stated otherwise, the descriptions of the respective configurations of the seat 1 and the seat rotating device 5 will be based on the premise that the seat 1 and the seat rotating device 5 are in the reference position. Specifically, a "vehicle width direction DX," a "vehicle front-rear direction DY," and a "top-bottom direction DZ" in the seat rotating device 5 will represent a direction along the width direction of a vehicle, a direction along the front-rear direction of the vehicle, and a direction along the top-bottom direction of the vehicle when the seat rotating device 5 is in the reference position, respectively.

Figure 1:
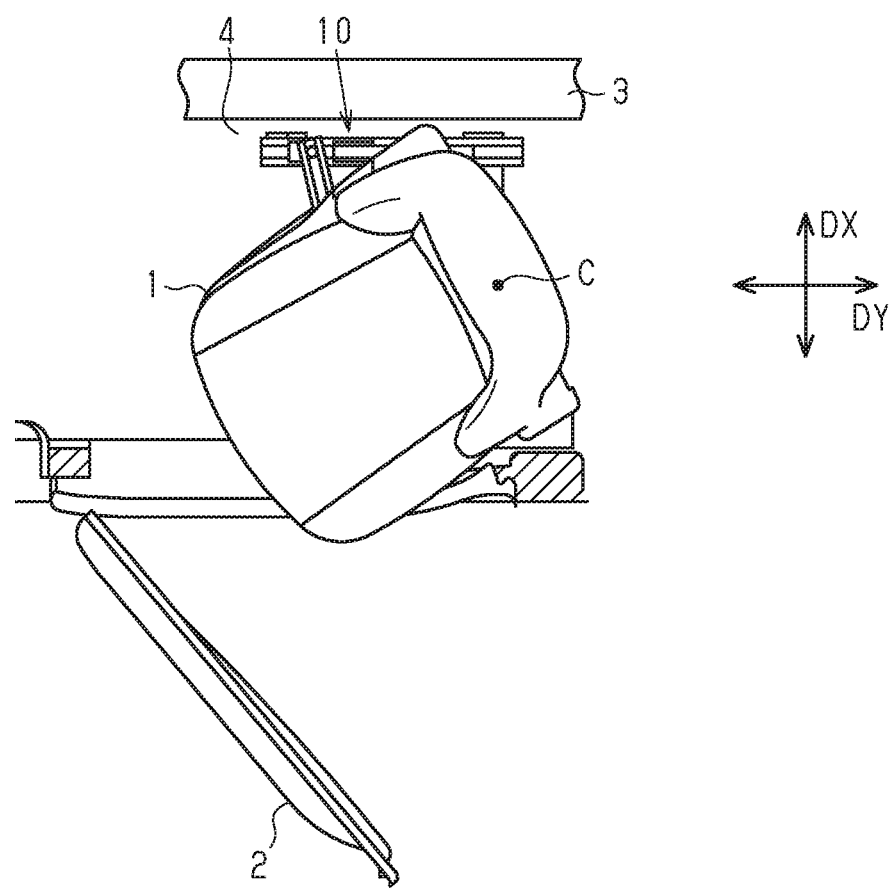
FIG. 1 is a plan view of a vehicle seat.
Figure 2:
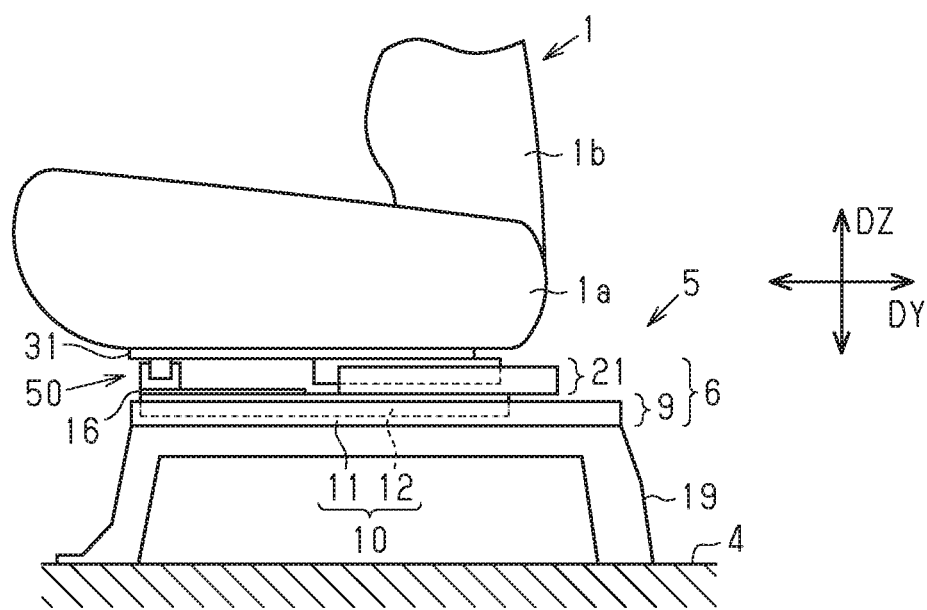
FIG. 2 is a side view of the vehicle seat.

The seat 1 will be described with reference to FIGS. 1 and 2. The seat 1 includes a seat cushion 1a and a seat back 1b.

The seat 1 is arranged on the side of a vehicle door 2. That is, the seat 1 is arranged between the vehicle door 2 and a vehicle central part 3. The seat 1 is fixed to a vehicle floor 4 via a seat rotating device 5. The seat 1 rotates with the operation of the seat rotating device 5. Hereinafter, the rotation of the front part of the seat 1 outward in the vehicle width direction DX from the reference position will be called "outward" rotation. In FIG. 1, the vehicle door 2 is open, and the seat 1 rotating outward based on the operation of the seat rotating device 5 is shown. At this time, a part of the front side of the seat 1 protrudes outward from a slide rail 10 (discussed further below) on the side of the vehicle door 2 as shown in FIG. 1.

The seat rotating device 5 will be described with reference to FIG. 3.

The seat rotating device 5 includes a plate 31 (discussed further below) that supports the seat 1 and a supporting unit 6 that rotatably supports the plate 31.

The supporting unit 6 includes at least a rotation supporting part 21 that rotatably supports the plate 31. The rotation supporting part 21 typically includes a pair of straight guide rails 23 as will be described later. The supporting unit 6 may include, besides the rotation supporting part 21, a supporting stand 9 that supports the rotation supporting part 21. The supporting stand 9 represents a stand or a unit that supports the rotation supporting part 21. According to embodiments, the supporting stand 9 represents a pair of straight slide rails 10 that slides the seat 1 in the vehicle front-rear direction DY. With the operation of the slide rails 10, the position of the seat 1 may be changed in the vehicle front-rear direction DY.

The supporting unit 6 includes at least a pair of straight rails. Specifically, at least one of the rotation supporting part 21 and the supporting stand 9, which are components of the supporting unit 6, includes a pair of straight rails. For example, the rotation supporting part 21 may include the pair of guide rails 23, and/or the supporting stand 9 may include the pair of slide rails 10.

The seat rotating device 5 may further include a connecting rail 50 (discussed further below) that connects the front parts of a pair of arms 33 (discussed further below) to each other.

In addition, the seat rotating device 5 may include a motor 41 that directly or indirectly rotates the plate 31.

Hereinafter, the respective components will be described.

According to embodiments, the supporting stand 9 represents the pair of slide rails 10 with which the position of the seat 1 is changeable in the vehicle front-rear direction DY with respect to the vehicle floor 4. The slide rails 10 each have a lower rail 11 and an upper rail 12. A pair of lower rails 11 is arranged parallel to each other with an interval placed therebetween in the vehicle width direction DX. The lower rails 11 are placed on the vehicle floor 4 so as to make their longitudinal direction coincide with the vehicle front-rear direction DY. The lower rails 11 are fixed to the vehicle floor 4 via, for example, brackets 19.

The upper rails 12 slide along the lower rails 11. The pair of upper rails 12 is connected to each other by a base 13. The pair of upper rails 12 and the base 13 integrally move in the vehicle front-rear direction DY. The plate 31 is placed on the pair of upper rails 12 or the base 13 via the rotation supporting part 21. Accordingly, the plate 31 integrally moves in the vehicle front-rear direction DY with the pair of upper rails 12 and the base 13.

The slide rails 10 are provided with a locking unit (not shown). The locking unit fixes (locks) the upper rails 12 at any position with respect to the lower rails 11. When the upper rails 12 fixed to the lower rails 11 are unlocked with the unlocking operation of the locking unit, the upper rails 12 are allowed to move with respect to the lower rails 11 and the seat 1 is allowed to move in a front-rear direction.

Figure 3:
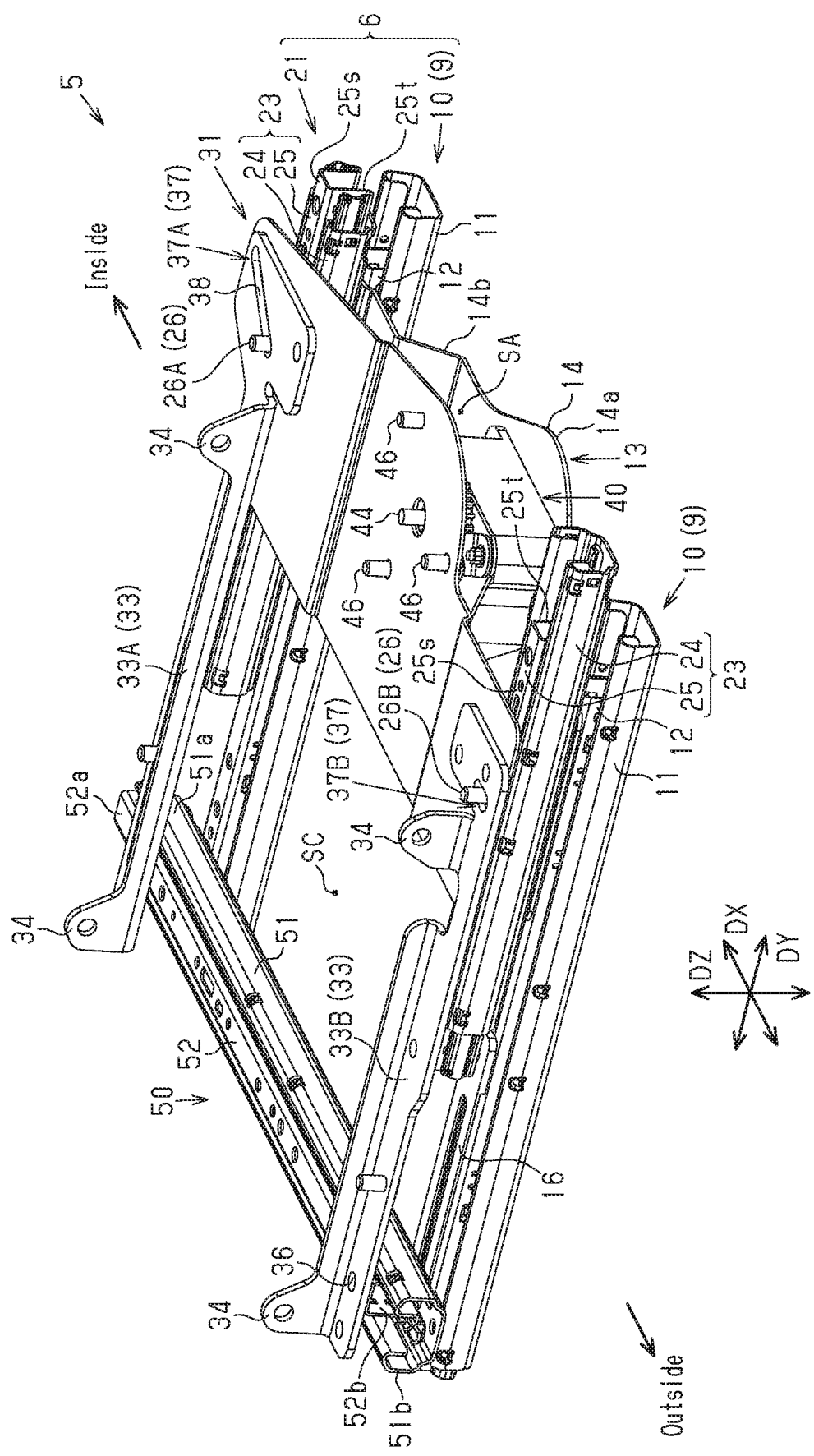
FIG. 3 is a perspective view of a seat rotating device.
Figure 4:
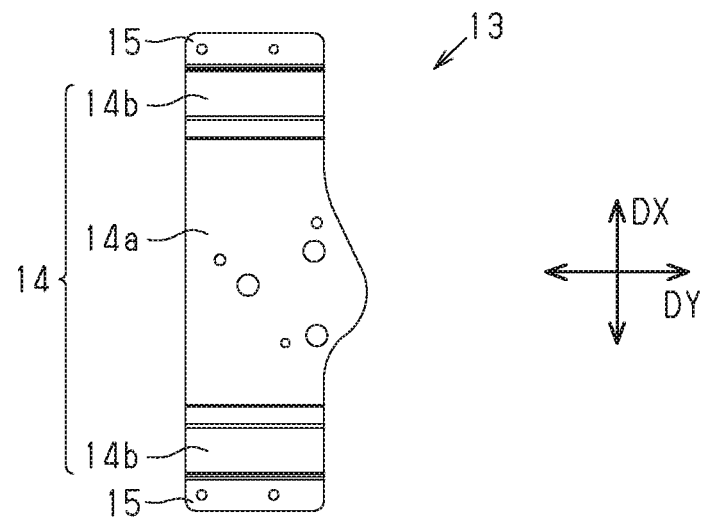
FIG. 4 is a plan view of a base.

As shown in FIGS. 3 and 4, the base 13 includes a base body part 14 and two fixed parts 15 fixed to the upper rails 12. The base body part 14 has a bottom part 14a arranged at a position lower than the fixed parts 15 and arm parts 14b joining the bottom part 14a to the fixed parts 15. The bottom part 14a is arranged under the plate 31. Between the plate 31 and the bottom part 14a, accommodation space SA (see FIG. 3) in which a driving unit 40 that will be described later is arranged is provided.

Next, the rotation supporting part 21 of the seat rotating device 5 will be described.

As described above, the rotation supporting part 21 rotatably supports the plate 31. The rotation supporting part 21 includes the pair of straight guide rails 23 that supports the plate 31 (see FIG. 3). The pair of guide rails 23 is arranged parallel to each other with an interval placed therebetween in the vehicle width direction DX.

The guide rails 23 each include a fixed rail 24 and a sliding member 25 that supports the plate 31 and slides along the fixed rail 24. The respective fixed rails 24 are attached to the base 13 or the upper rails 12 so as to be along the upper rails 12. The fixed rails 24 may be mounted on the upper rails 12. When the fixed rails 24 are attached to the base 13, the fixed rails 24 may be arranged adjacent to the upper rails 12 in the vehicle width direction DX.

The respective sliding members 25 move along the fixed rails 24. According to embodiments, the sliding members 25 move in the vehicle front-rear direction DY when the seat rotating device 5 is in the reference position.

Each sliding member 25 has a sliding body part 25t that slides along the fixed rail 24 and an engaging part 26 that is provided on the sliding body part 25t and engages the plate 31. Preferably, rolling members (not shown) are interposed between the fixed rail 24 and the sliding body part 25t to smoothly move the sliding member 25. The rolling members include balls that contact both the sliding body part 25t and the fixed rail 24. The sliding body part 25t is supported by the fixed rail 24 via the rolling members. The sliding body part 25t has a supporting surface 25s that supports the plate 31. Some (peripheral part of guides 37 as described below) of the plate 31 is placed on the supporting surface 25s. The engaging part 26 is provided on the supporting surface 25s. The engaging part 26 protrudes from the supporting surface 25s.

Among the pair of sliding members 25, a sliding member 25 (hereinafter called an "inside sliding member 25A") arranged on a vehicle central side in the vehicle width direction DX slidably engages a guide 37 (an inside guide 37A as described below) formed near the inner end of the plate 31 via an engaging part 26A. Among the pair of sliding members 25, a sliding member 25 (hereinafter called an "outside sliding member 25B") arranged on the side of the vehicle door 2 in the vehicle width direction DX slidably engages a guide 37 (an outside guide 37B as described below) formed near the outer end of the plate 31 in the vehicle width direction DX via an engaging part 26B.

The plate 31 will be described with reference to FIGS. 3 and 5.

As described above, the plate 31 supports the seat 1. The plate 31 rotates with respect to the supporting stand 9. When the seat rotating device 5 is in the reference position, the axis of rotation of the plate 31 extends along the top-bottom direction DZ (vertical direction). Hereinafter, the intersection of the axis of rotation of the plate 31 and a surface of the plate 31 perpendicular to the axis of rotation will be called a "center of rotation C." As will be described later, the center of rotation C of the plate 31 is set at the region between the guide rails 23 in the vehicle width direction DX (the region does not include regions on the guide rails 23).

Figure 5:
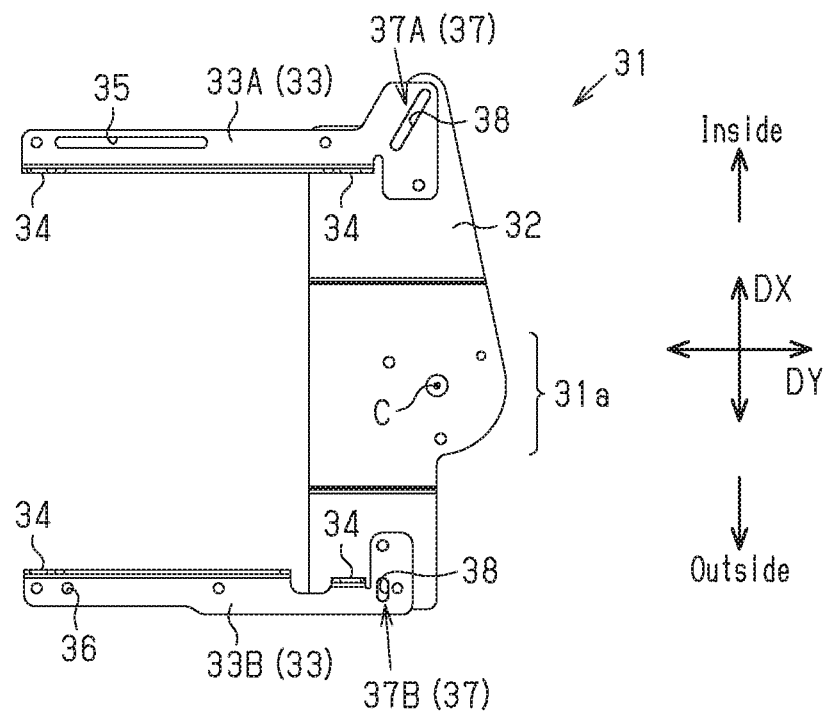
FIG. 5 is a plan view of a plate.

As shown in FIG. 5, the plate 31 includes a body part 32 and two arms 33 that extend from the body part 32.

The body part 32 is bridged across the pair of guide rails 23.

The two arms 33 extend forward from the body part 32. The two arms 33 are fixed to the body part 32. When the seat 1 is in the reference position, the two arms 33 extend along the respective upper rails 12. In the relationship between the arms 33 and the seat 1, a space SB between the arms 33 is arranged in an area AS in front of a region AR on the seat cushion 1a in which the seat back 1b is provided (see FIG. 11).

The arms 33 each have two fastening parts 34 for fixing the seat 1. The two fastening parts 34 are provided at the front and rear parts of the arms 33. The two arms 33 may be formed separately from the body part 32 or may be integrally formed with the body part 32.

Among the two arms 33, an arm 33 (hereinafter called an "inside arm 33A") on the vehicle central side is provided with a connecting rail guide 35 that guides an inner end 52a (discussed further below) of a second rail 52 of the connecting rail 50. Specifically, the connecting rail guide 35 guides a second sliding pin 54 provided at the inner end 52a of the second rail 52. The connecting rail guide 35 extends rearward from a place near the front end of the inside arm 33A. The connecting rail guide 35 represents, for example, a through slot (this is the case of the present embodiment) or a groove formed on the arm 33.

Among the two arms 33, an arm 33 (hereinafter called an "outside arm 33B") on the side of the vehicle door 2 is provided with a rail supporting part 36 that rotatably supports an outer end 52b (discussed further below) of the second rail 52 of the connecting rail 50. When the second rail 52 is provided with a shaft, the rail supporting part 36 represents a bearing that receives the shaft. When the second rail 52 is provided with a bearing, the rail supporting part 36 represents a shaft received by the bearing.

The plate 31 further has the pair of guides 37 that guides the pair of sliding members 25.

The respective guides 37 slidably engage one of the sliding members 25 and associate the rotation of the plate 31 and the movement in opposite directions of the pair of sliding members 25 with each other. The movement in the opposite directions refers to the inside sliding member 25A moving in a prescribed direction, and the outside sliding member 25B moving concurrently in the opposite direction.

The guides 37 are configured such that the plate 31 rotates while causing the pair of sliding members 25 to move in directions opposite to each other. That is, the guides 37 are configured such that the pair of sliding members 25 move in directions opposite to each other based on the rotation of the plate 31.

The guides 37 each include an inner surface (hereinafter called a "guiding surface 38") of a penetration hole into which the engaging part 26 of the sliding member 25 is inserted. When the plate 31 rotates, the respective guiding surfaces 38 push the corresponding engaging parts 26. Therefore, the respective sliding members 25 move in the vehicle front-rear direction DY with the rotation of the plate 31. The plate 31 is supported by the supporting surfaces 25s of the sliding members 25 until the plate 31 is set in a prescribed position after its rotation (hereinafter called a "post-rotation position") from the reference position. The specific configuration of the guides 37 will be described later.

Figure 6:
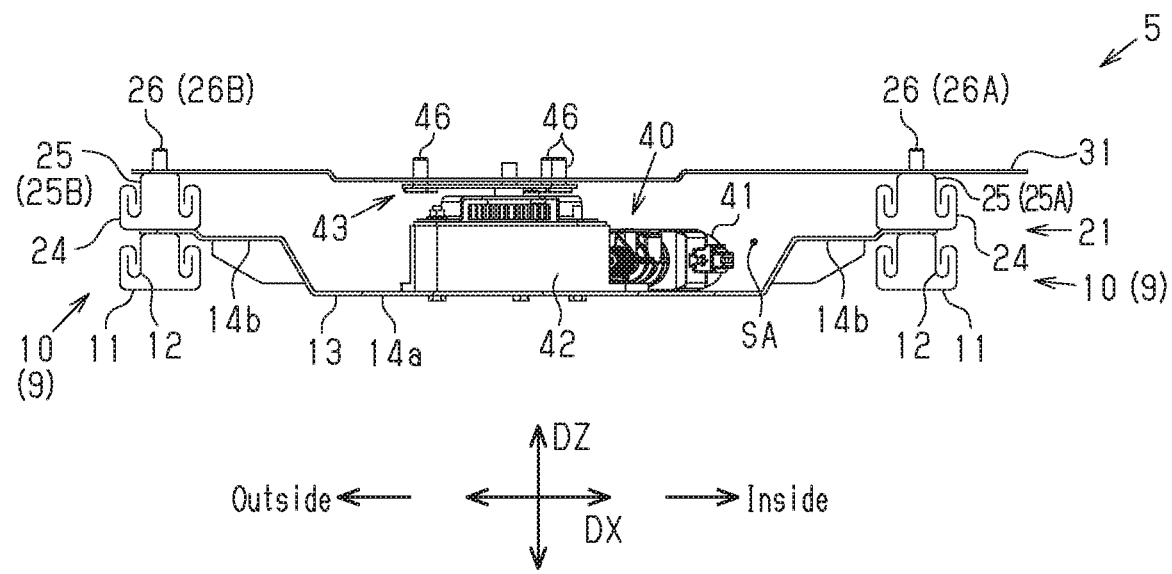
FIG. 6 is a back view of the seat rotating device.

The supporting structure of the plate 31 will be described with reference to FIGS. 3, 5, and 6.

The plate 31 is supported at three or more points. When the seat rotating device 5 includes the connecting rail 50, the plate 31 is supported also by the connecting rail 50. Here, the three-point supporting structure of the plate 31 will be described.

The both ends of the plate 31 in the vehicle width direction DX are supported by the respective guide rails 23. In addition, a part including the center of rotation C (hereinafter called a "rotation center part 31a," see FIG. 5) of the plate 31 is supported by the base 13. According to embodiments, the rotation center part 31a of the plate 31 is supported by the base 13 via a speed reducer 42 attached to the base 13. In this way, the plate 31 is supported by the pair of guide rails 23 and the base 13.

Figure 7:
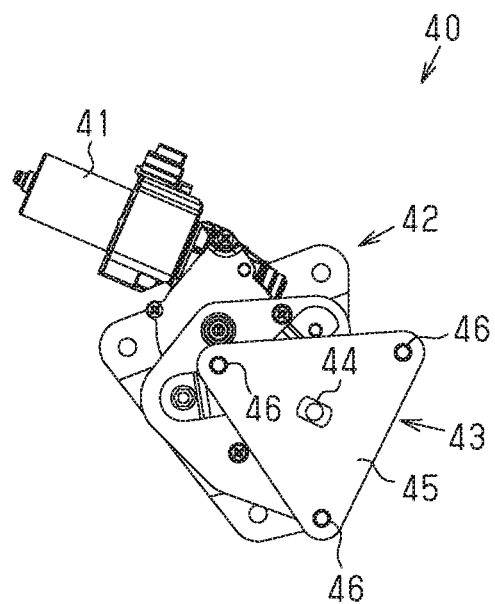
FIG. 7 is a plan view of a driving unit.

A driving unit 40 that rotates the plate 31 will be described with reference to FIG. 7.

The driving unit 40 includes a motor 41 and a speed reducer 42 that reduces the output of the motor 41. The motor 41 and the speed reducer 42 are attached to the base 13. The speed reducer 42 reduces the output of the motor 41 and transmits rotating power to the plate 31. The output part 43 of the speed reducer 42 includes an output shaft 44 that rotates, a supporting part 45 that is attached to the output shaft 44 and supports the plate 31, and connecting parts 46 provided on the supporting part 45. The connecting parts 46 are fastened to the plate 31. The connecting parts 46 are arranged on a circle about the output shaft 44. The connecting parts 46 may be bolts to be connected to the plate 31 with nuts.

The position of the center of rotation C of the plate 31 will be described with reference to FIGS. 8 to 10.

In the seat rotating device 5, the plate 31 is rotatably supported by the pair of guide rails 23. Therefore, the position of the center of rotation C may be set at any position between the pair of guide rails 23.

Figure 8:
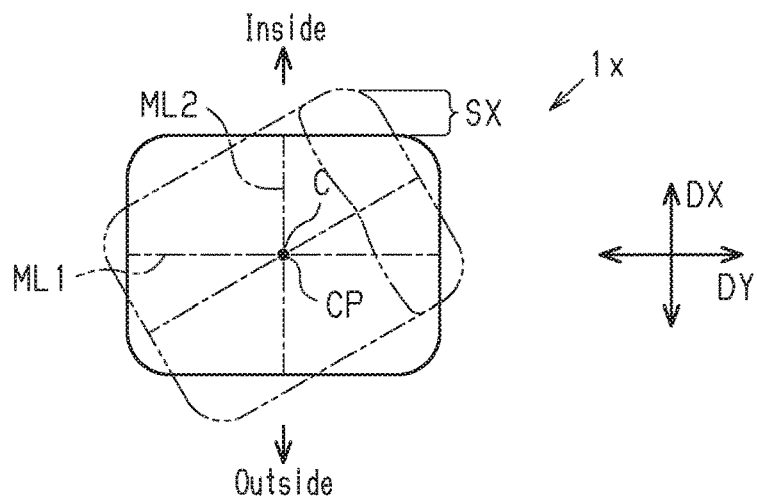
FIG. 8 is a view showing a seat for reference and describing the position of the center of rotation of the seat.

FIG. 8 is a view illustrating the position of a center of rotation C of a comparative example seat 1x relative to the seat 1 according to exemplary embodiments. In FIGS. 8 to 10, the seats 1 and 1x in the reference position are shown by solid lines, and the seats 1 and 1x in the post-rotation position are shown by double-dash chain lines. The rotation angles of the respective seats 1x and 1 shown in FIGS. 8 to 10 are the same.

As shown in FIG. 8, the comparative seat 1x for reference has a center of rotation C coinciding with the central point CP of the seat 1x. Here, the central point CP is defined as the intersection of a middle line ML1 at an equal distance from both the lateral edges of the seat 1x in the vehicle width direction DX and a middle line ML2 at an equal distance from both the front and rear edges of the seat 1x in the vehicle front-rear direction DY. In this case, the rear-inside corner of the seat 1x in the post-rotation position locates inward in the vehicle width direction DX than the rear-inside corner of the seat 1x in the reference position, and the rear-inside corner deviates inward from the inside guide rail 23 by a greater amount. Therefore, vacant space SX for allowing the rear-inside corner of the seat 1x to enter during the rotation of the seat 1x is required to be provided along the inside lateral edge of the seat 1x.

Figure 9:
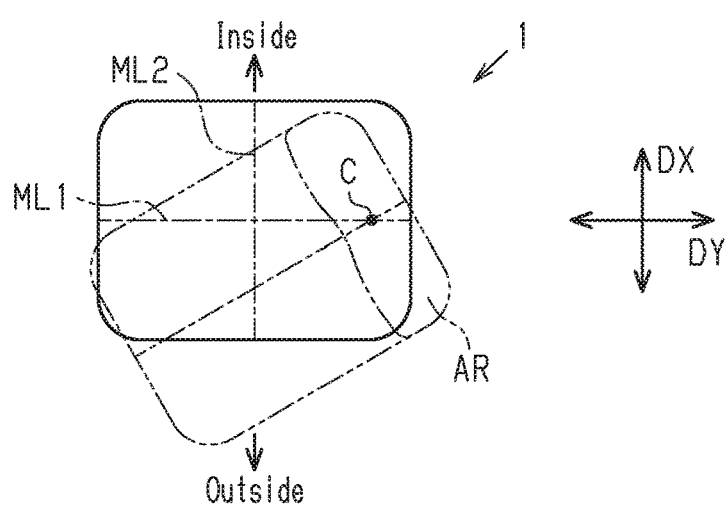
FIG. 9 is a view illustrating the position of the center of rotation of the seat.

The center of rotation C of the seat 1 shown in FIG. 9 is located toward the rear side from a middle line ML2 of the seat 1. Specifically, when seen in a plan view, the center of rotation C of the seat 1 falls within the region AR in which the seat back 1b is provided on the seat cushion 1a. In this case, the rear-inside corner of the seat 1 deviates by a small amount after and during the rotation of the seat 1. Thus, the vacant space SX described above may be narrowed, and wasted vacant space SX in vehicle interior space may be reduced.

Figure 10:
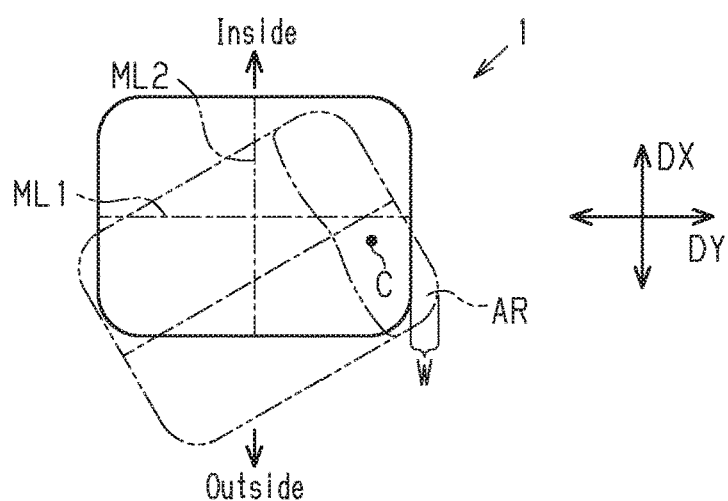
FIG. 10 is a view illustrating the position of the center of rotation of the seat.

The center of rotation C of the seat 1 shown in FIG. 10 is located toward the rear side from the middle line ML2 and toward the outside from the central point CP of the seat 1. Specifically, when seen in a plan view, the center of rotation C of the seat 1 falls within the region AR in which the seat back 1b is provided on the seat cushion 1a, and is located toward the outside from the middle line ML1 of the seat 1 in the vehicle width direction DX. In this case, the amount of rearward deviation of the rear-outside corner of the seat 1 in the post-rotation position is smaller than that of the example shown in FIG. 9. If a width W of such a deviation becomes great, space behind the seat 1 in the post-rotation position is narrowed, which in turn decreases available space for the rear seat. However, according to the configuration shown in FIG. 10, the reduction of the available space for the rear seat may be prevented.

Examples of the arrangement of the center of rotation C of the plate 31 will be described below.

Figure 11:
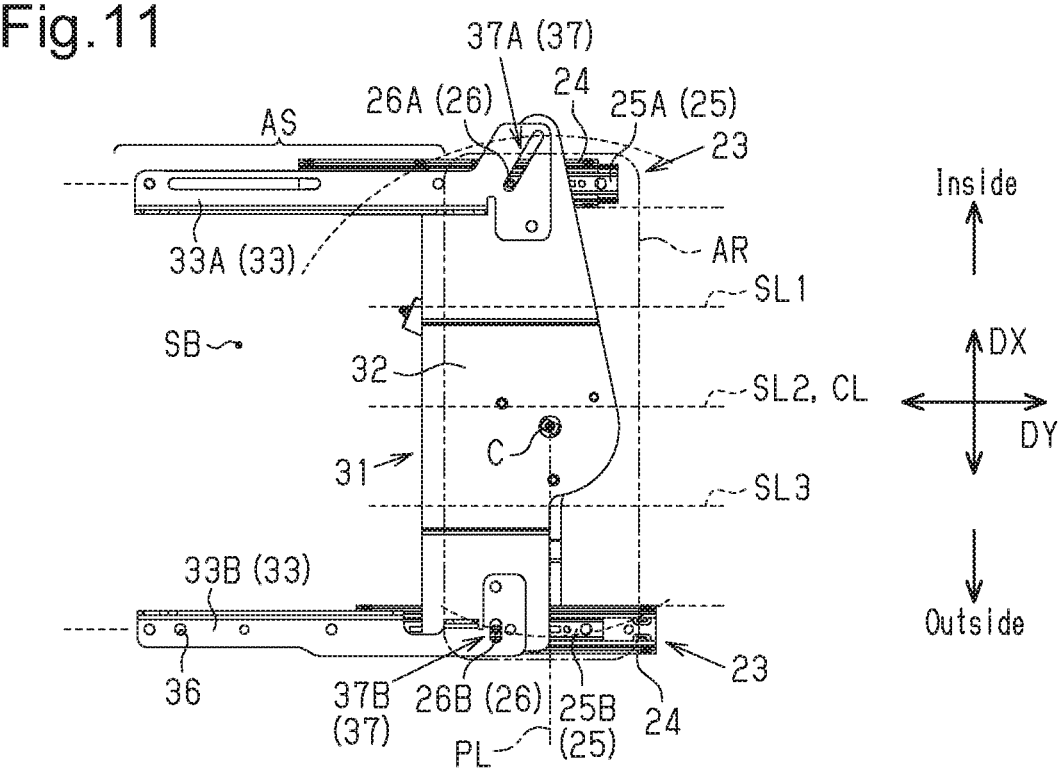
FIG. 11 is a plan view of the seat rotating device in a reference position.

(a) The center of rotation C of the plate 31 is arranged between a pair of rails and falls within the region AR in which the seat back 1b of the seat 1 is provided. The expression "between a pair of rails" represents the place between the pair of guide rails 23 when the seat rotating device 5 includes only the guide rails 23 as rails, and represents the place between the pair of slide rails 10 when the seat rotating device 5 includes only the slide rails 10 as rails. When the seat rotating device 5 includes both the guide rails 23 and the slide rails 10 as rails like the present embodiment, the expression "between a pair of rails" represents the place between rails having a shorter interval in the vehicle width direction DX among both the rails. The "region AR" described above represents a plan view projected area of the seat back 1b of the seat 1 in a standard upright position. In FIG. 11, the region AR based on the seat back 1b is schematically shown.

(b) The center of rotation C of the plate 31 is located between the pair of guide rails 23 and toward the outside in the vehicle width direction DX from a center line CL at an equal distance from the guide rails 23 in the vehicle width direction DX.

(c) The center of rotation C of the plate 31 is arranged between the pair of guide rails 23 and arranged between a first boundary line SL1 and a third boundary line SL3 among the first boundary line SL1, a second boundary line SL2, and the third boundary line SL3 with which the place between the pair of guide rails 23 is evenly divided into four places in the vehicle width direction DX.

A specific example of the guides 37 will be described with reference to FIGS. 11 to 14.

The configurations of the guides 37 are determined based on the relationship between the guides 37 and the movement paths of the engaging parts 26 of the sliding members 25. First, the movement paths of the engaging parts 26 of the sliding members 25 will be described.

As shown in FIG. 11, the engaging part 26A of the inside sliding member 25A and the engaging part 26B of the outside sliding member 25B are located toward the front side from the center of rotation C in the vehicle front-rear direction DY when the seat rotating device 5 is in the reference position.

Figure 12:
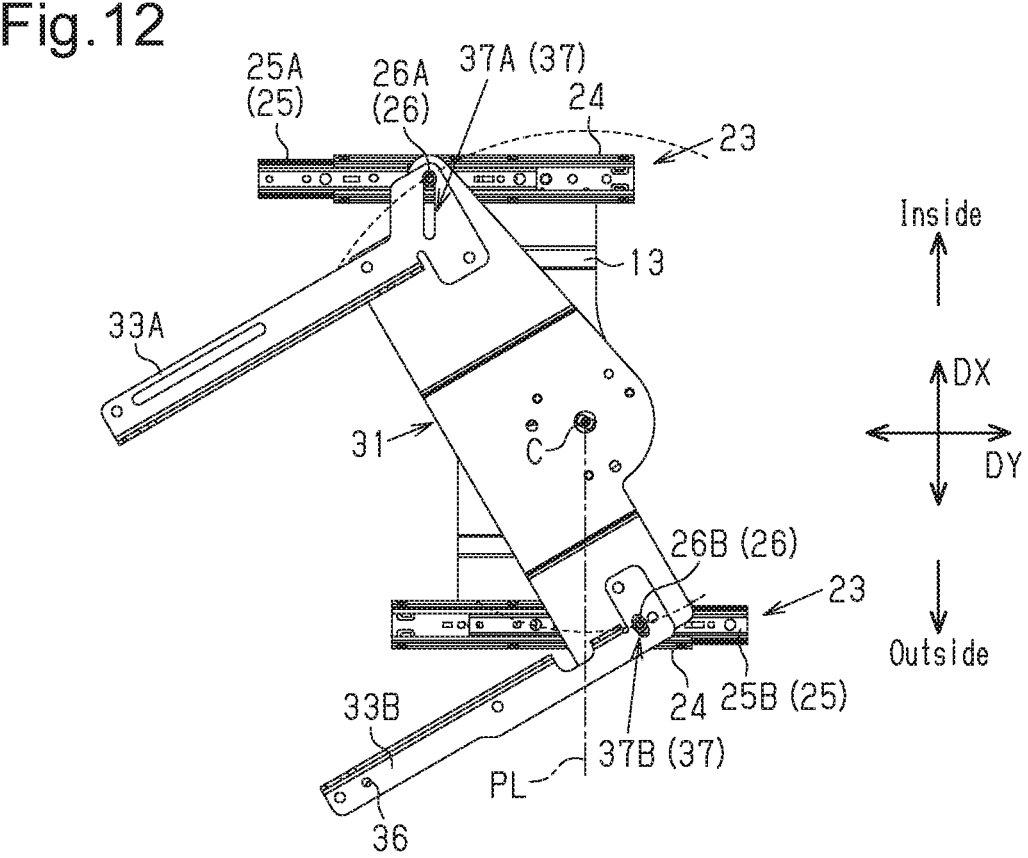
FIG. 12 is a plan view of the seat rotating device in a post-rotation position.

As shown in FIG. 12, when the plate 31 rotates outward, the inside sliding member 25A slides forward so as to move away from a line (hereinafter called a "perpendicular line PL") passing through the center of rotation C and extending orthogonally with respect to the guide rail 23, while the outside sliding member 25B moves rearward across the perpendicular line PL.

Figure 13:
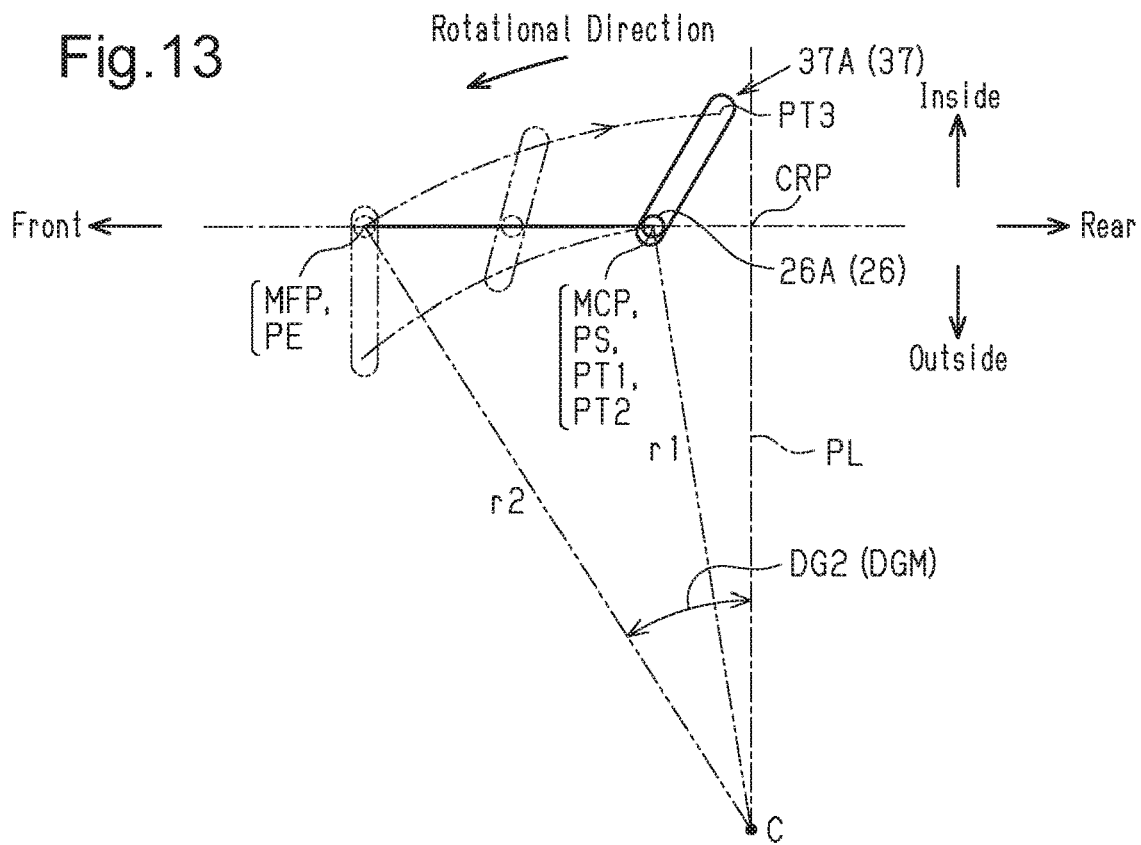
FIG. 13 is a schematic view illustrating an inside guide.
Figure 14:
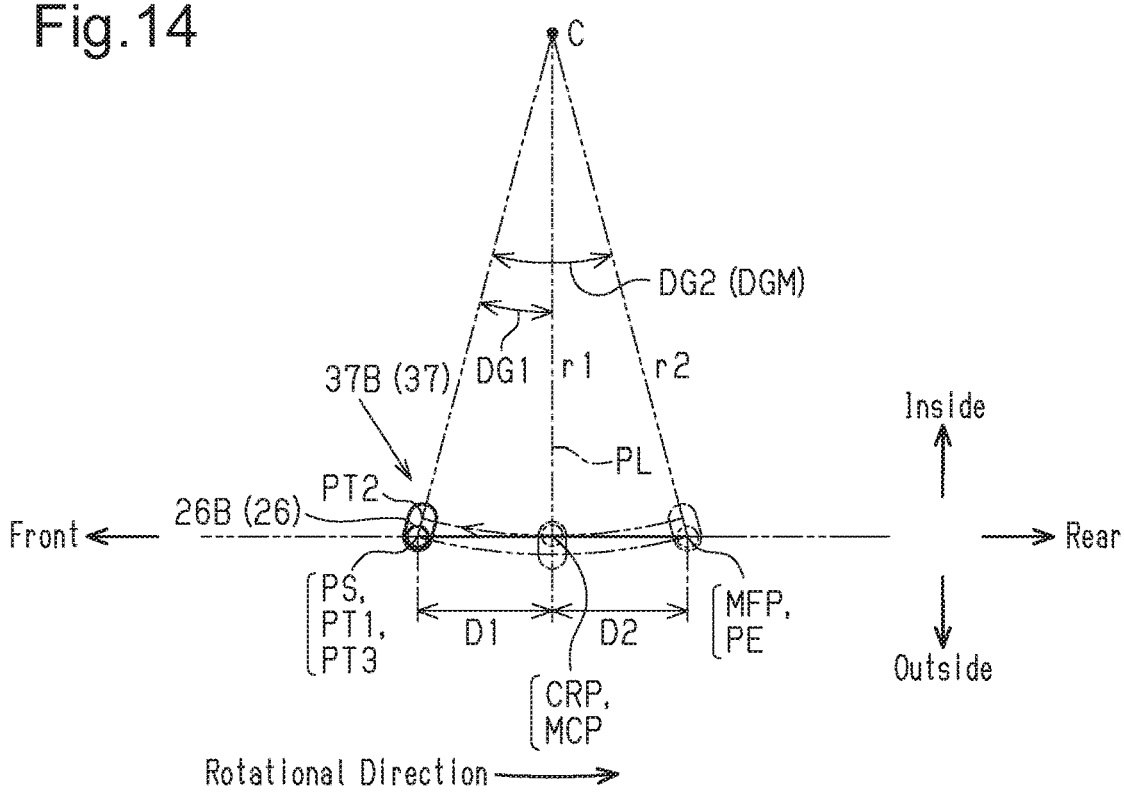
FIG. 14 is a schematic view illustrating an outside guide.

In the movement of the engaging parts 26, the positions of the respective engaging parts 26 when the seat rotating device 5 is in the reference position will be called "starting points PSs" (see FIGS. 13 and 14), and the positions thereof when the seat rotating device 5 is in the post-rotation position will be called "ending points PEs" (see FIGS. 13 and 14). The rotation angle of the plate 31 of the seat rotating device 5 from the reference position to the post-rotation position will be called a "maximum rotation angle DGM." When the seat rotating device 5 rotates from the reference position to the post-rotation position, points on the movement paths of the respective engaging parts 26 nearest from the center of rotation C will be defined as "nearest points MCPs" and points farthest from the center of rotation C will be defined as "farthest points MFPs." For each of the engaging parts 26A and 26B, a circle with the straight line distance between the center of rotation C and the nearest point MCP as a radius r1 will be called a "small circle," and a circle with the straight line distance between the center of rotation C and the farthest point MFP as a radius r2 will be called a "large circle." Parts of the large circles with the radius r2 are shown by broken lines in FIGS. 11 and 12.

The guide 37 on the vehicle central side in the vehicle width direction DX (hereinafter called the "inside guide 37A") engages the engaging part 26A of the inside sliding member 25A. When the plate 31 rotates outward, the inside guide 37A moves the inside sliding member 25A so that the engaging part 26A moves away from the perpendicular line PL.

The guide 37 on the side of the vehicle door 2 in the vehicle width direction DX (hereinafter called the "outside guide 37B") engages the engaging part 26B of the outside sliding member 25B. When the plate 31 rotates outward, the outside guide 37B moves the outside sliding member 25B so that the engaging part 26B moves across the perpendicular line PL.

As described above, the guides 37 are set in consideration of the movement paths of the engaging parts 26 (26A and 26B) of the sliding members 25 (25A and 25B) associated with the rotation of the plate 31. The respective guides 37 are configured so as to connect a first position PT1, a second position PT2, and a third position PT3 defined as follows on the plate 31.

The first positions PT1s are positions corresponding to the respective starting points PSs of the engaging parts 26 on the plate 31 when the seat rotating device 5 is in the reference position.

The second positions PT2s are positions on the plate 31 corresponding to the nearest points MCPs that have been rotated in an opposite rotational direction (a rotational direction opposite to an outward rotational direction) by first assumptive rotation angles DG1s along the small circles when the seat rotating device 5 is in the reference position. The first assumptive rotation angles DG1s represent the rotation angles of the plate 31 to cause the movement of the engaging parts 26A and 26B from the starting points PSs to the nearest points MCPs, and are separately set for each of the engaging parts 26A and 26B (see FIGS. 13 and 14).

The third positions PT3s are positions on the plate 31 corresponding to the farthest points MFPs that have been rotated in the opposite rotational direction (the rotational direction opposite to the outward rotational direction) by second assumptive rotation angles DG2s along the large circles when the seat rotating device 5 is in the reference position. The second assumptive rotation angles DG2s represent the rotation angles of the plate 31 to cause the movement of the engaging parts 26A and 26B from the starting points PSs to the farthest points MFPs, and are separately set for each of the engaging parts 26A and 26B (see FIGS. 13 and 14).

The inside guide 37A will be described with reference to FIG. 13.

The movement path of the engaging part 26A of the inside sliding member 25A is positioned ahead of the perpendicular line PL.

The position of the nearest point MCP is the same as that of the starting point PS of the movement path of the engaging part 26A. In this case, the first assumptive rotation angle DG1 is zero degree. The farthest point MFP is the ending point PE of the movement path of the engaging part 26A. In this case, the second assumptive rotation angle DG2 is the same as the maximum rotation angle DGM of the plate 31.

According to the definition of the first position PT1, the starting point PS of the movement path of the engaging part 26A corresponds to the first position PT1. The second position PT2 is the position of the nearest point MCP (the starting point PS) that has been rotated by the first assumptive rotation angle DG1 ("zero degree") in the opposite rotational direction. Therefore, the second position PT2 overlaps with the position of the starting point PS. That is, the first position PT1 and the second position PT2 are the same. The third position PT3 is the position of the farthest point MFP (the ending point PE) that has been rotated by the second assumptive rotation angle DG2 (the maximum rotation angle DGM) in the opposite rotational direction. In this way, the first position PT1, the second position PT2, and the third position PT3 are set. The inside guide 37A is configured to pass through these positions.

The outside guide 37B will be described with reference to FIG. 14.

The movement path of the engaging part 26B of the outside sliding member 25B is configured to extend across the perpendicular line PL. For example, a first distance D1 between an intersecting point CRP at which the movement path of the engaging part 26B and the perpendicular line PL cross each other and the front end (the starting point PS) of the movement path of the engaging part 26B is 0.5 times or more to twice or less of a second distance D2 between the intersecting point CRP and the rear end (the ending point PE) of the movement path of the engaging part 26B. According to embodiments, the distance between the intersecting point CRP and the ending point PE of the movement path is the same as the distance between the intersecting point CRP and the starting point PS of the movement path. The position of the nearest point MCP and the position of the intersecting point CRP are the same. The first assumptive rotation angle DG1 is half the maximum rotation angle DGM. The farthest point MFP is the ending point PE of the movement path of the engaging part 26B. In this case, the second assumptive rotation angle DG2 is the same as the maximum rotation angle DGM of the plate 31.

According to the definition of the first position PT1, the starting point PS of the movement path of the engaging part 26B corresponds to the first position PT1. The second position PT2 is the position of the intersecting point CRP, which is the same as the nearest point MCP, that has been rotated by the first assumptive rotation angle DG1 (the angle half the maximum rotation angle DGM) in the opposite rotational direction. The third position PT3 is the position of the ending point PE, which is the same as the farthest point MFP that has been rotated by the second assumptive rotation angle DG2 (the maximum rotation angle DGM) in the opposite rotational direction. In this way, the first position PT1, the second position PT2, and the third position PT3 are set. The outside guide 37B is configured to pass through these positions.

Note that the length of the outside guide 37B shown in FIG. 14 is different from that of the outside guide 37B shown in other figures such as FIG. 12. The outside guide 37B shown in other figures has an outer end that extends outwardly further than the outer end of the schematic outside guide 37B shown in FIG. 14 does. The extended portion serves as an allowance portion for absorbing any positional deviations of respective components occurred during assembling. By the existence of the allowance portion, the movement restriction of the outside sliding member 25B caused by the positional deviations of the respective components may be mitigated.

In some configurations, at least one of the pair of guides 37 is configured such that the movement path of the engaging part 26 of the corresponding sliding member 25 extends across the perpendicular line PL (this requirement will be hereinafter called a "guide requirement"). As shown in FIG. 14, the outside guide 37B satisfies the guide requirement as described above. According to the configuration, the length of the guide 37 may be reduced compared with a configuration (see, for example, FIG. 13) in which the engaging part 26 of the sliding member 25 does not move across the perpendicular line PL. A reason for the reduction in the length of the guide 37 is as follows. As described above, the length of the guide 37 is set based on the movement path of the engaging part 26. The greater the difference in the distances from the center of rotation C to the farthest point MFP and the nearest point MCP, the longer the length of the guide 37. The difference in the distances becomes greater when the movement path of the sliding member 25 is set at a place distant from the perpendicular line PL. Accordingly, the guide 37 becomes shorter when the movement path of the engaging part 26 is configured to extend across the perpendicular line PL.

The connecting rail 50 will be described with reference to FIG. 3 and FIGS. 15 to 17.

The connecting rail 50 connects the pair of arms 33 of the plate 31 to each other. In addition, the connecting rail 50 supports the pair of arms 33 of the plate 31. Moreover, the connecting rail 50 supports the pair of arms 33 during a period in which the seat rotating device 5 rotates from the reference position to the post-rotation position.

The connecting rail 50 includes a first rail 51 and the second rail 52 that slides along the first rail 51. The first rail 51 is attached to the supporting stand 9. According to embodiments, the supporting stand 9 represents the slide rails 10. The first rail 51 is bridged across the pair of upper rails 12. The first rail 51 is configured to remain bridged across the pair of upper rails 12 during the period in which the seat rotating device 5 rotates from the reference position to the post-rotation position. The second rail 52 is bridged across the pair of arms 33 of the plate 31. The second rail 52 is configured to remain bridged across the pair of arms 33 during the period in which the seat rotating device 5 rotates from the reference position to the post-rotation position.

An inner end 51a of the first rail 51 in the vehicle width direction DX is rotatably attached to the upper rail 12 of the inside slide rail 10. For example, the inner end 51a is attached to the upper rail 12 via a shaft member.

An outer end 51b of the first rail 51 in the vehicle width direction DX is slidably attached to the upper rail 12 of the outside slide rail 10. Specifically, the outside upper rail 12 is provided with a connecting rail guide 16 that guides the outer end 51b of the first rail 51 along the longitudinal direction of the upper rail 12. On the lower surface of the outer end 51b of the first rail 51, a first sliding pin 53 is slidably provided along the longitudinal direction of the first rail 51. The first sliding pin 53 slides along the connecting rail guide 16. The connecting rail guide 16 is, for example, a groove or a through slot. As the plate 31 rotates from the reference position to the post-rotation position, the first sliding pin 53 moves rearward along the upper rail 12 while moving outward (outward in the vehicle width direction DX) in the first rail 51.

The inner end 52a of the second rail 52 in the vehicle width direction DX is slidably attached to the inside arm 33A of the plate 31. Specifically, the inside arm 33A is provided with the connecting rail guide 35 that guides the inner end 52a of the second rail 52 along the longitudinal direction of the inside arm 33A as described above. Further, on the upper surface of the inner end 52a of the second rail 52, the second sliding pin 54 is slidably provided along the longitudinal direction of the second rail 52. The second sliding pin 54 slides along the connecting rail guide 35. As the plate 31 rotates from the reference position to the post-rotation position, the second sliding pin 54 moves rearward along the inside arm 33A while moving inward (inward in the vehicle width direction DX) in the second rail 52.

The outer end 52b of the second rail 52 in the vehicle width direction DX is rotatably attached to the outside arm 33B of the plate 31. For example, the outer end 52b is attached to the outside arm 33B via a shaft member.

The operation of the seat rotating device 5 will be described with reference to FIGS. 15 to 17. Note that the slide rails 10 are omitted in FIGS. 15 to 17.

Figure 15:
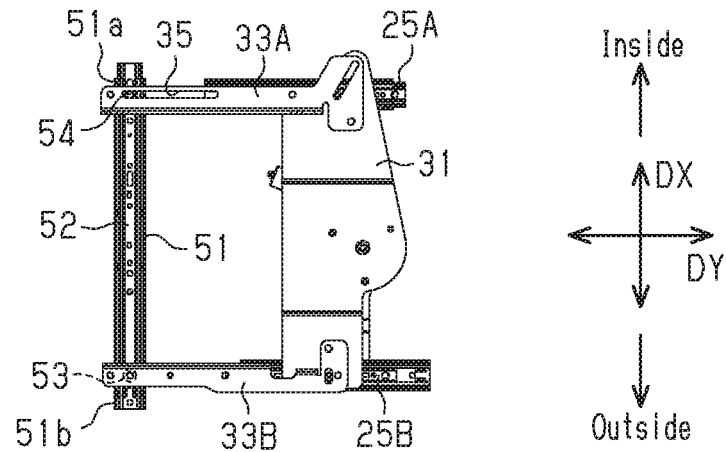
FIG. 15 is a first plan view showing the operation of the seat rotating device.

FIG. 15 shows the seat rotating device 5 that is in the reference position. At this time, the front end of the inside arm 33A and the front end of the outside arm 33B are located on the upper rails 12.

Figure 16:
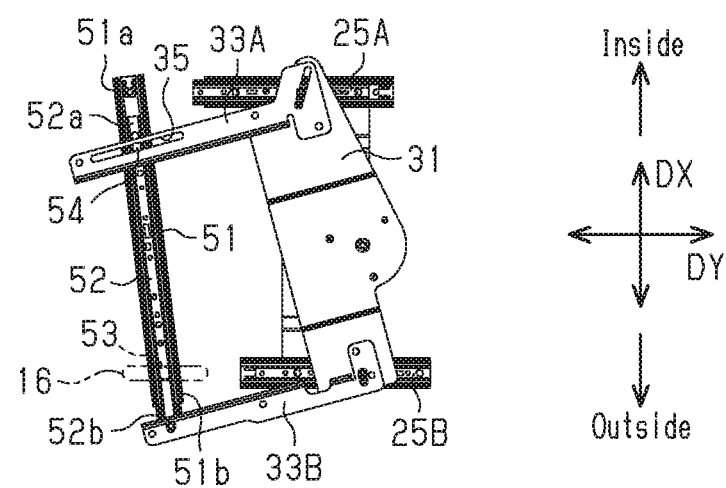
FIG. 16 is a second plan view showing the operation of the seat rotating device.

As shown in FIG. 16, when the plate 31 rotates outward with the power of the driving unit 40, the inside sliding member 25A moves forward while the outside sliding member 25B moves rearward. In addition, as the inside sliding member 25A and the outside sliding member 25B operate, the first rail 51 rotates about the inner end 51a while the second rail 52 rotates about the outer end 52b. As a result, the second rail 52 moves outward in the vehicle width direction DX with respect to the first rail 51. At this time, the outer end 51b of the first rail 51 slides along the connecting rail guide 16 via the first sliding pin 53, and the inner end 52a of the second rail 52 slides along the connecting rail guide 35 of the inside arm 33A via the second sliding pin 54.

Figure 17:
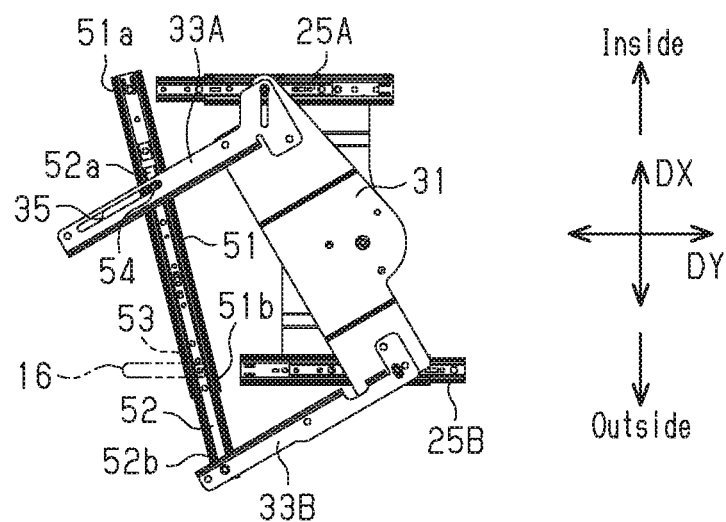
FIG. 17 is a third plan view showing the operation of the seat rotating device.

As shown in FIG. 17, when the plate 31 rotates to reach the post-rotation position, the outer end 51b of the first rail 51 reaches the rear end of the connecting rail guide 16 and the inner end 52a of the second rail 52 reaches the rear end of the connecting rail guide 35 of the inside arm 33A. At this time, the front end of the outside arm 33B and the front end of the inside arm 33A are located at positions deviated from the upper rails 12. However, the front end of the outside arm 33B and the intermediate portion of the inside arm 33A are supported by the connecting rail 50. Further, the connecting rail 50 is arranged so as to be bridged across the pair of upper rails 12 and the pair of arms 33. As a result, when the seat rotating device 5 is in the post-rotation position, a load applied to the front side of the seat 1, and thus to the outside arm 33B, is transmitted to the slide rail 10. In this way, the force exerted on the outside arm 33B is dispersed, and the deformation of the outside arm 33B is prevented.

Operations of the seat rotating device 5 will be described.

The seat rotating device 5 includes the plate 31 that supports the seat 1 and the pair of guide rails 23 that supports the plate 31. The plate 31 has the guides 37 that guide the sliding members 25. The guides 37 are configured such that the plate 31 rotates while causing the pair of sliding members 25 to move in directions opposite to each other. The plate 31 is not supported by an arc-shaped guide but is supported by the pair of straight guide rails 23. Since the seat rotating device 5 does not include an arc-shaped structure, the seat rotating device 5 can be easily manufactured. In addition, in the case of an arc-shaped guide, the guide is required to be curved along a round shape. Therefore, an arc-shaped guide is difficult to produce at a high yield. Since the manufacturing step of the guide rails 23 does not include the step of curving the guide rails 23, the guide rails 23 are easily manufactured, and manufacturing yield may be improved.

The effects of the seat rotating device 5 according to the above-described embodiments will be described.

(1) The seat rotating device 5 includes the plate 31 that supports the seat 1 and the pair of guide rails 23 that supports the plate 31. The guide rails 23 each have the fixed rail 24 and the sliding member 25 that slides along the fixed rail 24. The plate 31 includes the guides 37 that guide each of the sliding members 25. The guides 37 are configured such that the plate 31 rotates while causing the sliding members 25 to move in directions opposite to each other.

According to the configuration, portions distant from the rotation center part 31a in the plate 31 are not supported by an arc-shaped guide but are supported by the pair of guide rails 23. Thus, the seat rotating device 5 does not include an arc-shaped structure. Therefore, the seat rotating device 5 is more easily manufactured than a seat rotating device including an arc-shaped structure.

(2) The seat rotating device 5 further includes the pair of slide rails 10. The slide rails 10 each have the lower rail 11 and the upper rail 12 that slides along the lower rail 11. The fixed rails 24 are arranged along the upper rails 12. According to the configuration, compared with a case in which the fixed rails 24 are obliquely arranged with respect to the upper rails 12, space SC spreading between the pair of fixed rails 24 and between the pair of slide rails 10 may be increased.

(3) The seat rotating device 5 further includes the base 13 that connects the upper rails 12 to each other. The rotation center part 31a of the plate 31 is supported by the base 13.

The plate 31 may be rotated on the pair of guide rails 23 even if the rotation center part 31a of the plate 31 is not supported. However, there is a likelihood that the plate 31 may not be smoothly rotated. According to the configuration, the center of gravity of the plate 31 or a place near the center of gravity of the plate 31 is supported by the base 13. Therefore, the rotation of the plate 31 is stabilized.

(4) The seat rotating device 5 further includes the motor 41 that directly or indirectly rotates the plate 31. The motor 41 is attached to the base 13.

According to the configuration, the structure of a power transmission mechanism from the motor 41 to the plate 31 may be simplified compared with a case in which the motor 41 is fixed to a vehicle. Here, an operation in which the motor 41 "directly rotates" the plate 31 includes an operation in which the motor 41 rotates the plate 31 via the speed reducer 42. An operation in which the motor 41 "indirectly rotates" the plate 31 includes an operation in which the motor 41 moves the sliding members 25 to cause rotation of the plate 31.

(5) The center of rotation C of the plate 31 is arranged between the pair of guide rails 23.

When the center of rotation C is arranged directly above one of the guide rails 23, the deviating distance of one of the guides 37 extending outward (for example, inward in a vehicle width direction) from an inside region (the region between the pair of guide rails 23) becomes greater than the deviating distance of the other of the guides 37 extending outward (for example, outward in the vehicle width direction) from the inside region. Thus, when the deviating distance becomes unevenly great on one side of the plate 31, a great unevenness occurs in the vacant space SX provided on the lateral side of the seat 1 for smoothly rotating the seat 1. Such an unevenness of the space induces the unevenness of the provided position of the seat 1 and is not preferable in terms of appearance. According to the configurations of the present embodiments, the center of rotation C of the plate 31 is arranged between the pair of guide rails 23. Therefore, the difference between the deviating distance of one of the guides 37 extending outward from the inside region and the deviating distance of the other of the guides 37 extending outward from the inside region may be reduced.

(6) In some embodiments, a seat rotating device 5 includes: a plate 31 used to support a seat 1; and a pair of straight guide rails 23 arranged parallel to each other and supporting the plate 31. The guide rails 23 each have a fixed rail 24 and a sliding member 25 that supports the plate 31 and is slidable along the fixed rail 24. The plate 31 has two holes 37 and the sliding members 25 are slidably engaged in respective ones of the two holes 37. The two holes 37 are shaped such that the plate 31 rotates while causing the sliding members 25 to move in directions opposite to each other along the fixed rails 24, or movement of the sliding members 25 in directions opposite to each other along the fixed rails 24 causes rotation of the plate 31.

According to the configuration, the same effect as that described in the item (1) is obtained.

OTHER EMBODIMENTS

The seat rotating device 5 is not limited to the above embodiments. Other embodiments include, but are not limited to, the following examples.

In the seat rotating device 5, the slide rails 10 may be omitted. In this case, the rotation supporting part 21 may be directly fixed to the vehicle floor 4 or may be fixed to the vehicle floor 4 via a fixing member such as a bracket or a board. The pair of guide rails 23 may be fixed to the vehicle floor 4. Such a seat rotating device 5 may be attached to, for example, a vehicle rear seat or a truck passenger seat.

The mechanism of rotating the plate 31 is not limited to the driving unit 40. For example, the plate 31 may rotate based on the operation of a sliding member driving unit (not shown) that moves the pair of sliding members 25 of the rotation supporting part 21 in directions opposite to each other. The sliding member driving unit includes, for example, a motor and a connecting device that connects the inside sliding member 25A and the outside sliding member 25B. The motor transmits power to at least one of the inside sliding member 25A, the outside sliding member 25B, and the connecting device to move the same. The connecting device moves the inside sliding member 25A and the outside sliding member 25B in directions opposite to each other. The connecting device includes, for example, a link mechanism or a wire that connects the inside sliding member 25A and the outside sliding member 25B to each other. In this case, the guides 37 may take the following "second configuration."

Instead of the embodiments in which the guides 37 are configured such that the plate 31 rotates while causing the pair of sliding members 25 to move in opposite directions (hereinafter called a "first configuration"), the guides 37 may be configured such that the plate 31 rotates based on the movement of the pair of sliding members 25 in opposite directions (hereinafter called a "second configuration"). The guides 37 of the second configuration are configured such that the plate 31 rotates based on the movement of the pair of sliding members 25 in opposite directions driven by the motor 41. The guides 37 of the first configuration and the guides 37 of the second configuration may have the same shape.

In embodiments, the seat rotating device 5 preferably includes a play reduction part 60. The play (space) between two or more pairs of components (discussed further below) that move relative to each other with the rotation of the plate 31 is reduced by the play reduction part 60 when the plate 31 is positioned at a predetermined rotating position with respect to the pair of fixed rails 24. The predetermined rotating position is, for example, a first rotating position or a second rotating position. The first rotating position is the rotating position of the plate 31 of the seat rotating device 5 in the reference position as shown in FIG. 15. The second rotating position is the rotating position of the plate 31 of the seat rotating device 5 in the post-rotation position as shown in FIG. 17.

The seat rotating device including the play reduction part 60 according to a modified example will be described with reference to FIGS. 18 to 25.

The play reduction part 60 includes a member that changes the frictional resistance between two components of which the positional relationship changes with the rotation of the plate 31. The play reduction part 60 is provided between a pair of components of which the positional relationship changes with the rotation of the plate 31. Specifically, the play reduction part 60 is provided in a spacer arranged between a pair of components of which the positional relationship changes with the rotation of the plate 31. In embodiments, a first spacer 61 is provided on the inside connecting rail guide 35. A second spacer 62 is provided on the outside connecting rail guide 16. A third spacer 63 is provided on the inside guide 37A of the plate 31. A fourth spacer 64 is provided on the outside guide 37B of the plate 31. The play reduction part 60 is formed on each of the first spacer 61 to the fourth spacer 64.

Figure 18:
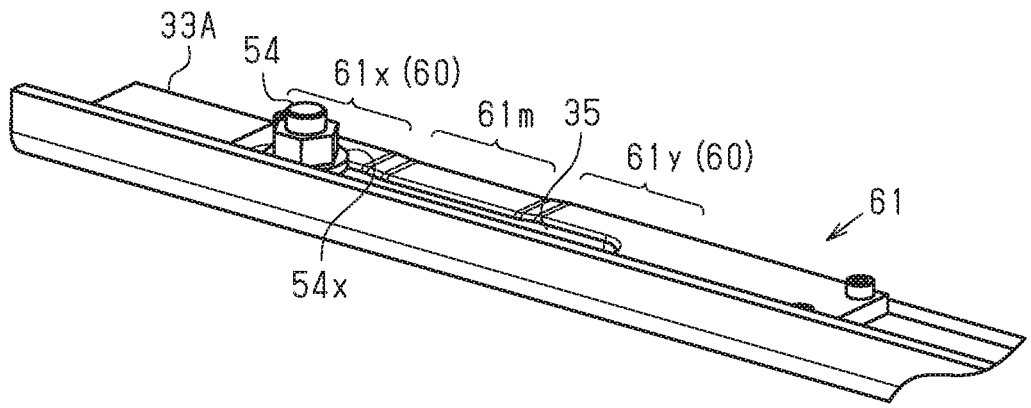
FIG. 18 is a perspective view of an inside connecting rail guide including a first spacer and its surrounding structures in the seat rotating device according to a modified example.
Figure 19:
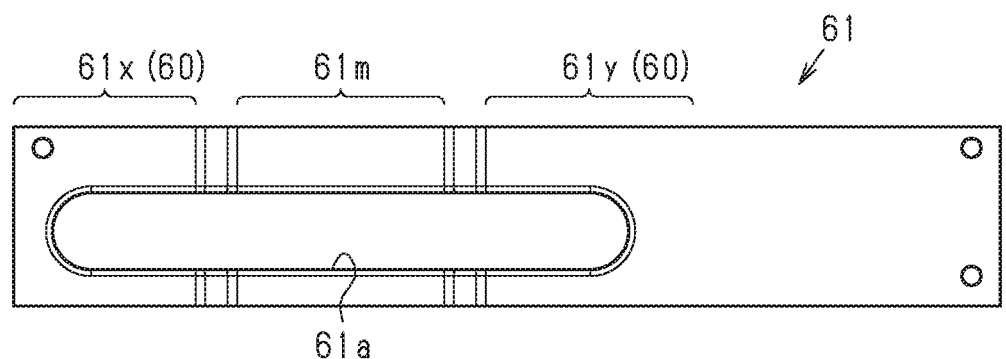
FIG. 19 is a plan view of the first spacer in the seat rotating device according to the modified example.
Figure 20:
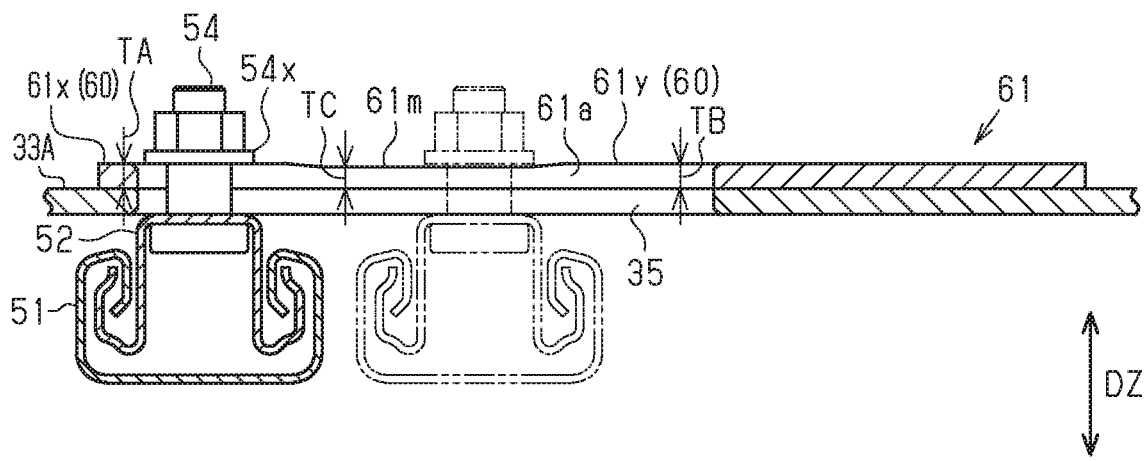
FIG. 20 is a cross-sectional view of the inside connecting rail guide including the first spacer and its surrounding structures in the seat rotating device according to the modified example.

The first spacer 61 will be described with reference to FIGS. 18, 19, and 20.

The first spacer 61 is provided on the upper surface of a part at which the connecting rail guide 35 is provided in the inside arm 33A. The first spacer 61 has a hole 61a having the same shape as that of the connecting rail guide 35. The first spacer 61 is arranged between the inside arm 33A and a contact part 54x of the second sliding pin 54 in the top-bottom direction DZ. The contact part 54x slides on the first spacer 61 as the plate 31 rotates. The first spacer 61 is made of metal. The contact part 54x is made of a material softer than that of the first spacer 61. For example, the contact part 54x is made of a resin. Thus, the generation of noise may be prevented or reduced.

The first spacer 61 has a first part 61x and a second part 61y along the movement direction of the second sliding pin 54. The first part 61x represents a part at which the second sliding pin 54 is located when the plate 31 is positioned at the first rotating position. The second part 61y represents a part at which the second sliding pin 54 is located when the plate 31 is positioned at the second rotating position. The first part 61x and the second part 61y each correspond to the play reduction part 60 described above. The first part 61x and the second part 61y are configured as follows to exhibit a function as the play reduction part 60.

Thicknesses TA and TB of the first part 61x and the second part 61y of the first spacer 61 are greater than thickness TC (thickness in the top-bottom direction DZ) of an intermediate part 61m between the first part 61x and the second part 61y. In embodiments, the upper surface of the first spacer 61 where the contact part 54x of the second sliding pin 54 contacts is configured as follows. The upper surfaces of the first part 61x and the second part 61y are arranged at positions higher in the top-bottom direction DZ than the upper surface of the intermediate part 61m between the first part 61x and the second part 61y. Specifically, the upper surface of the first spacer 61 is configured such that the upper surface is flat at the first part 61x, inclined to gradually descend from the first part 61x to the intermediate part 61m, flat at the intermediate part 61m, inclined to gradually ascend from the intermediate part 61m to the second part 61y, and flat at the second part 61y.

Figure 21:
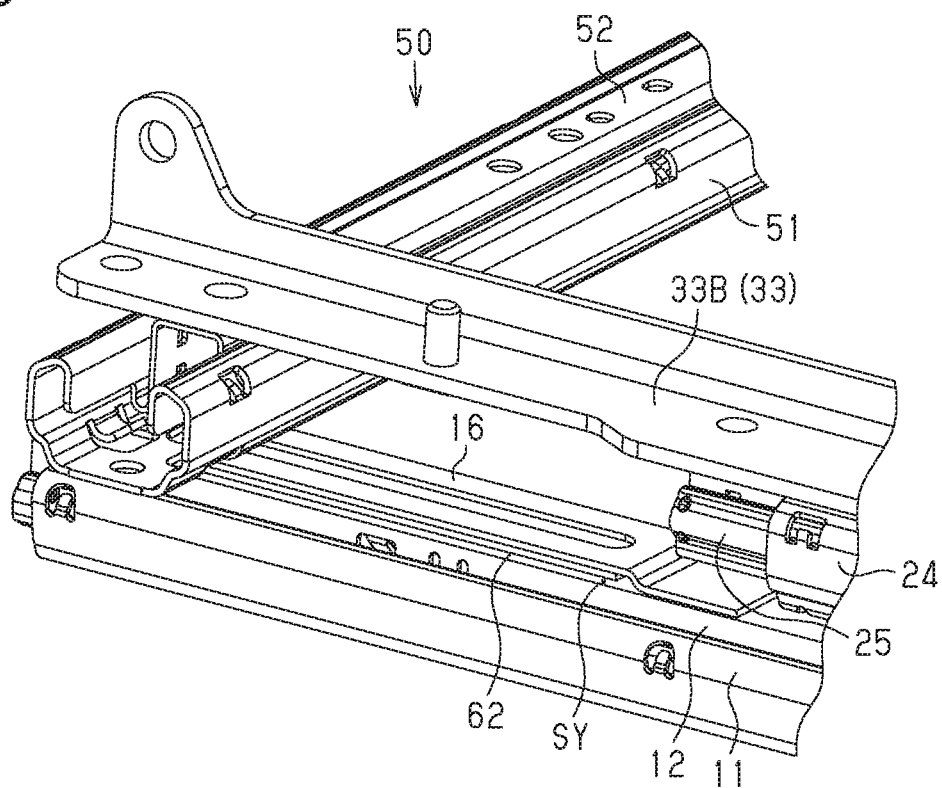
FIG. 21 is a perspective view of an outside connecting rail guide including a second spacer and its surrounding structures in the seat rotating device according to the modified example.
Figure 22:
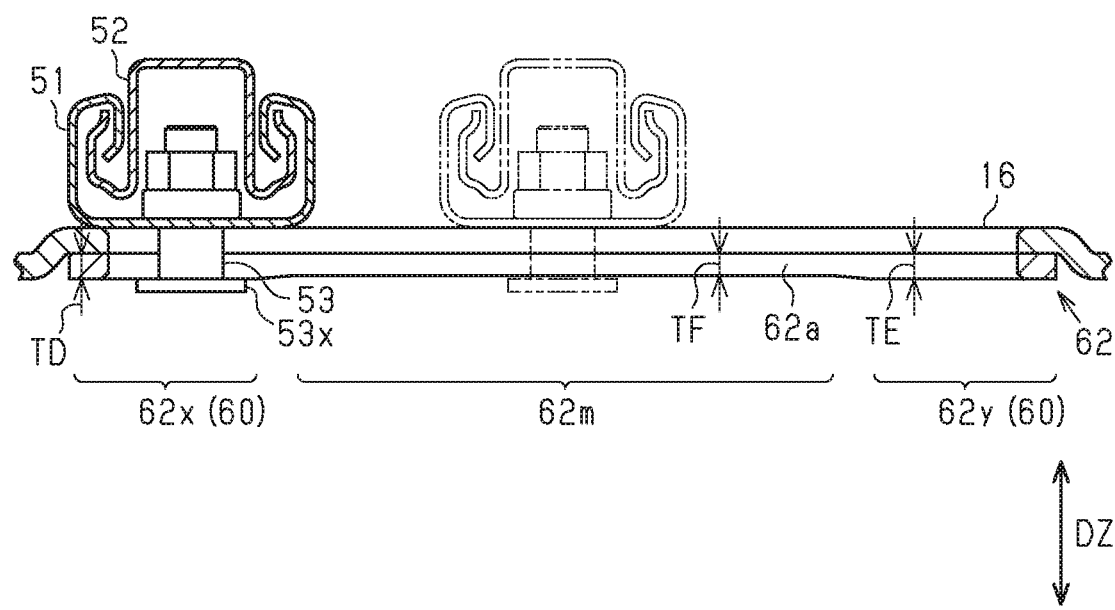
FIG. 22 is a cross-sectional view of the outside connecting rail guide including the second spacer and its surrounding structures in the seat rotating device according to the modified example.

The second spacer 62 will be described with reference to FIGS. 21 and 22.

The second spacer 62 is provided on the lower surface of the connecting rail guide 16. Between the second spacer 62 and the upper rail 12, space SY in which a contact part 53x of the first sliding pin 53 is movable is provided. The second spacer 62 has a hole 62a having the same shape as that of the connecting rail guide 16. The second spacer 62 is arranged between the connecting rail guide 16 and the contact part 53x of the first sliding pin 53 in the top-bottom direction DZ. The contact part 53x slides on the second spacer 62 as the plate 31 rotates. The second spacer 62 is made of metal. The contact part 53x is made of a material softer than that of the second spacer 62. For example, the contact part 53x is made of a resin. Thus, the generation of noise may be prevented or reduced.

The second spacer 62 has a first part 62x and a second part 62y along the movement direction of the first sliding pin 53. The first part 62x represents a part at which the first sliding pin 53 is located when the plate 31 is positioned at the first rotating position. The second part 62y represents a part at which the first sliding pin 53 is located when the plate 31 is positioned at the second rotating position. The first part 62x and the second part 62y each correspond to the play reduction part 60 described above. The first part 62x and the second part 62y are configured as follows to exhibit a function as the play reduction part 60.

Thicknesses TD and TE of the first part 62x and the second part 62y of the second spacer 62 are greater than thickness TF (thickness in the top-bottom direction DZ) of an intermediate part 62m between the first part 62x and the second part 62y. In embodiments, the lower surface of the second spacer 62 where the contact part 53x of the first sliding pin 53 contacts is configured as follows. The lower surfaces of the first part 62x and the second part 62y are arranged at positions lower in the top-bottom direction DZ than the lower surface of the intermediate part 62m between the first part 62x and the second part 62y. Specifically, the lower surface of the second spacer 62 is configured such that the lower surface is flat at the first part 62x, inclined to gradually ascend from the first part 62x to the intermediate part 62m, flat at the intermediate part 62m, inclined to gradually descend from the intermediate part 62m to the second part 62y, and flat at the second part 62y.

Figure 23:
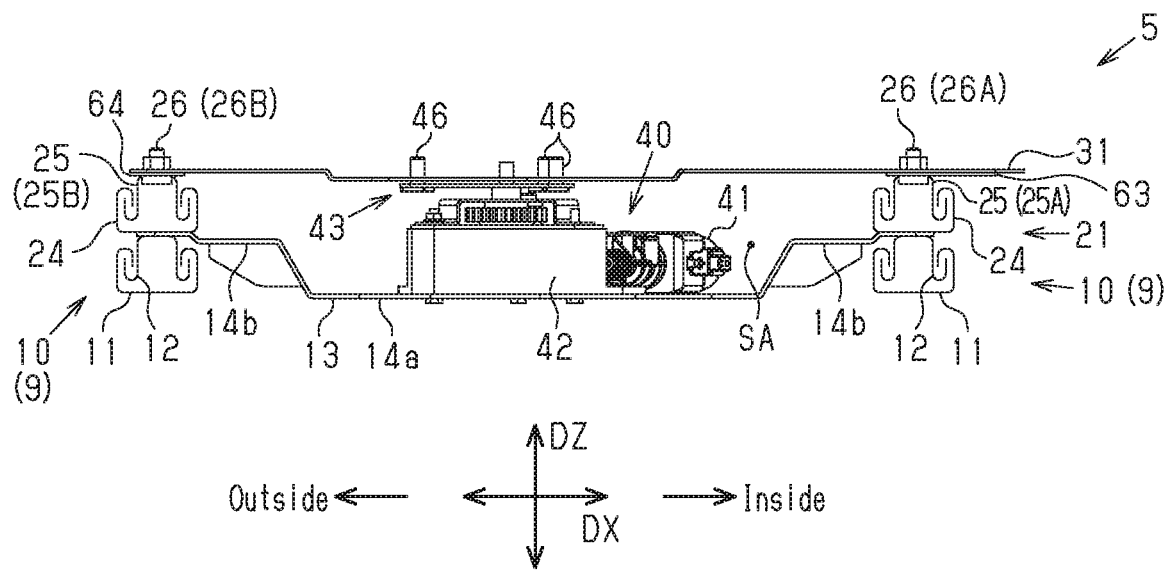
FIG. 23 is a back view of the seat rotating device according to the modified example.
Figure 24:
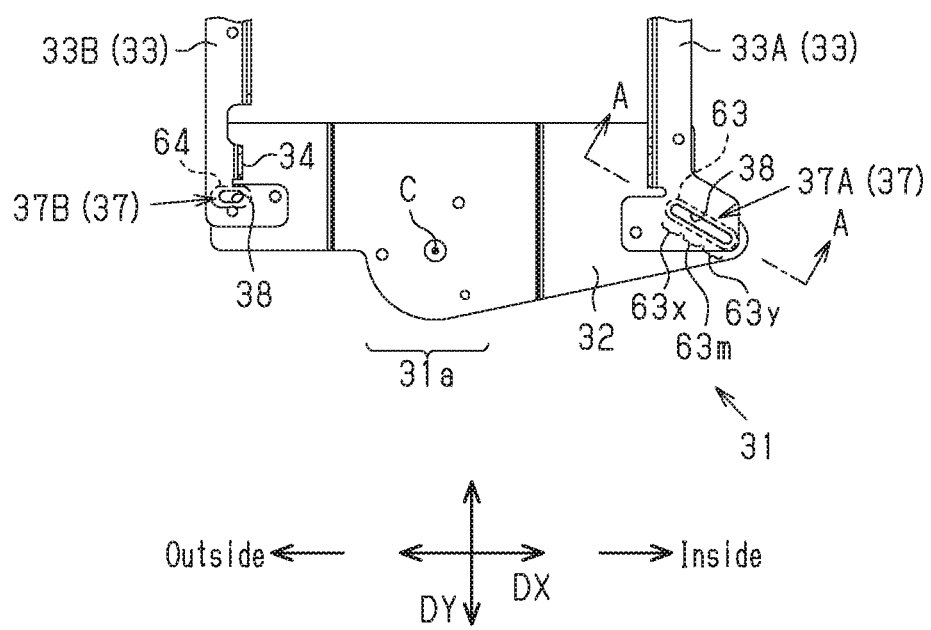
FIG. 24 is a plan view of the plate in the seat rotating device according to the modified example.
Figure 25:
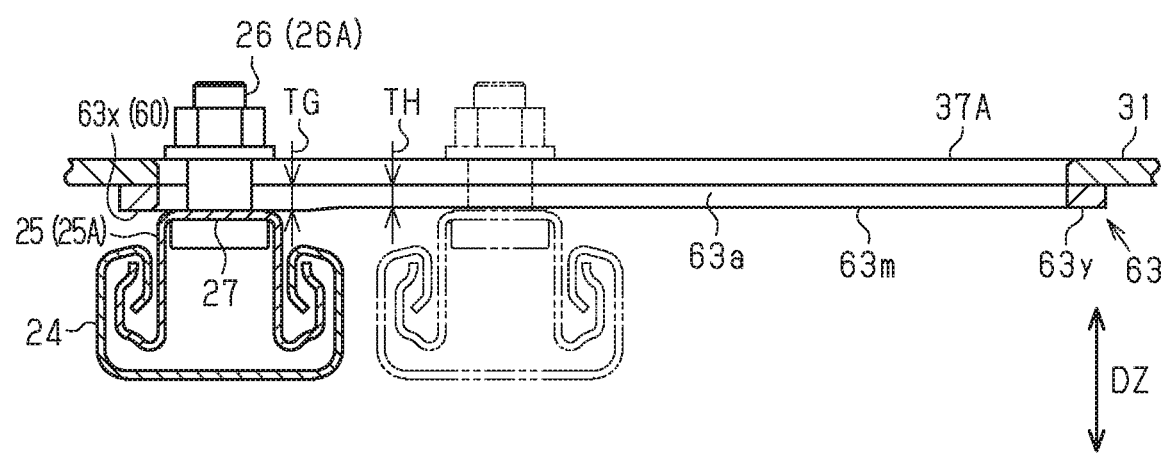
FIG. 25 is a cross-sectional view taken along line A-A in FIG. 24.

The third spacer 63 will be described with reference to FIGS. 23, 24, and 25.

The third spacer 63 is provided on the lower surface of a part at which the inside guide 37A is provided in the plate 31. The third spacer 63 has a hole 63a having the same shape as that of the inside guide 37A. The third spacer 63 is arranged between the plate 31 and an upper wall 27 of the inside sliding member 25A in the top-bottom direction DZ.

The third spacer 63 has a first part 63x and a second part 63y along the movement direction of the engaging part 26. The first part 63x represents a part at which the engaging part 26 is located when the plate 31 is positioned at the first rotating position. The second part 63y represents a part at which the engaging part 26 is located when the plate 31 is positioned at the second rotating position. The first part 63x corresponds to the play reduction part 60 described above. The first part 63x is configured as follows to exhibit a function as the play reduction part 60.

Thicknesses TG of the first part 63x of the third spacer 63 is greater than thickness TH (thickness in the top-bottom direction DZ) of a part of the third spacer 63 other than the first part 63x. In embodiments, the lower surface of the third spacer 63 where the inside sliding member 25A contacts is configured as follows. The lower surface of the first part 63x is arranged at a position lower in the top-bottom direction DZ than the lower surface of the part other than the first part 63x. Specifically, the lower surface of the third spacer 63 is configured such that the lower surface is flat at the first part 63x, inclined to gradually ascend from the first part 63x to an intermediate part 63m, and flat at the intermediate part 63m. The lower surface of the second part 63y is a flat surface at the same height level as the lower surface of the intermediate part 63m.

The fourth spacer 64 is arranged between the plate 31 and the outside sliding member 25B in the top-bottom direction DZ. For example, the fourth spacer 64 is provided on the lower surface of a part at which the outside guide 37B is provided in the plate 31. The structure of the third spacer 63 can be applied mutatis mutandis to the fourth spacer 64.

A user is seated when the seat rotating device 5 is in the reference position. Therefore, the position of the plate 31 is preferably stabilized when the plate 31 is in the first rotating position. The user is also seated when the seat rotating device 5 is in the post-rotation position. Therefore, the position of the plate 31 is further preferably stabilized when the plate 31 is in the second rotating position. Meanwhile, from the viewpoint of energy saving, the plate 31 may be preferably rotated with a small force. For this reason, the position of the plate 31 is preferably stabilized at the predetermined rotating position of the plate 31. The play reduction parts 60 of the seat rotating device 5 reduce the play of the plate 31 in the top-bottom direction DZ when the plate 31 is positioned at the predetermined rotating position. Thus, when the plate 31 is positioned at the predetermined rotating position, the plate 31 is stabilized in place and the rattling of the plate 31 is prevented or reduced.

Hereinafter, the effects of the modified example will be described.

(A1) As described above, the play reduction parts 60 reduce the play (space) between the two or more pairs of components that move relative to each other with the rotation of the plate 31 when the plate 31 is positioned at the predetermined rotating position with respect to the pair of fixed rails 24. Examples of the pairs of components include the pairing between the inside arm 33A and the contact part 54x of the second sliding pin 54, the pairing between the connecting rail guide 16 and the contact part 53x of the first sliding pin 53, the pairing between the plate 31 and the inside sliding member 25A, and the pairing between the plate 31 and the outside sliding member 25B, as described above. According to the configuration, play in the top-bottom direction DZ of the plate 31 is reduced at the position of a given rotating angle when the plate 31 is arranged at the predetermined rotating angle. Thus, the position of the plate 31 is stabilized, and rattling is prevented or reduced.

(A2) In some instances, the play reduction part 60 is provided on at least one component of at least a pair of components among the two or more pairs of components that move relative to each other with the rotation of the plate 31. The thickness of the play reduction part 60 in the top-bottom direction DZ is greater than the thickness of a part adjacent to the play reduction part 60 in a direction along the relative movement of the pairs of components. According to the configuration, the play reduction part 60 may be easily formed.

(A3) The play reduction parts 60 are provided at positions where the engaging members (the engaging part 26, the first sliding pin 53, and the second sliding pin 54) are located when the plate 31 are positioned at the predetermined rotating position (for example, the first rotating position or the second rotating position). According to the configuration, play in the top-bottom direction DZ of the plate 31 is reduced and the position of the plate 31 is stabilized when the plate 31 is positioned at the predetermined rotating position (for example, the first rotating position or the second rotating position).

Locations at which the play reduction parts 60 are provided are not limited to the above-described examples. In some instances, spacers may be placed at given positions between the fixed rails 24 and the sliding members 25. In some instances, a spacer may be placed at a given position between the first rail 51 and the second rail 52. In some instances, a spacer may be placed at a given position between the plate 31 and the base 13.

In the foregoing description, the play reduction part 60 is configured as the spacer. However, the play reduction part 60 may be configured as a protrusion or a stepped portion formed on the existing component (for example, the plate 31) of the seat rotating device. According to the configuration, the number of components may be reduced.

A plunger may be used as the play reduction part 60. The plunger has a member (for example, a steel ball) urged by a spring. The plunger may be used together with or instead of the spacer.

The present examples and embodiments are to be considered as illustrative and not restrictive and the invention is not to be limited to the details given herein, but may be modified within the scope and equivalence of the appended claims.

The invention claimed is:

1. A seat rotating device for a vehicle, comprising:
a plate used to support a seat; and
a pair of guide rails arranged side by side in a vehicle width direction and supporting the plate, wherein
the guide rails each have a fixed rail and a sliding member that supports the plate and is slidable along the fixed rail,
the plate includes guides that guide each of the sliding members, and
the guides are configured such that the plate rotates while causing the sliding members to move in directions opposite to each other or the plate rotates based on movement of the sliding members in directions opposite to each other.

2. The seat rotating device according to claim 1, further comprising:
a pair of slide rails used to move the seat in a vehicle front-rear direction, wherein
the slide rails each have a lower rail and an upper rail that slides along the lower rail, and
the fixed rails are arranged along the upper rails.

3. The seat rotating device according to claim 2, further comprising:
a base that connects the upper rails to each other, wherein
a part of the plate including a center of rotation is supported by the base.

4. The seat rotating device according to claim 3, further comprising a motor that directly or indirectly rotates the plate, wherein the motor is attached to the base.

5. The seat rotating device according to claim 1, wherein
a center of rotation of the plate is arranged between the pair of guide rails.

6. The seat rotating device according to claim 1, further comprising a play reduction part, wherein the play reduction part reduces play between two or more pairs of components that move relative to each other with rotation of the plate when the plate is positioned at a predetermined rotating position with respect to the fixed rails.

7. The seat rotating device according to claim 6, wherein
the play reduction part is provided on at least one component of at least a pair of components among the two or more pairs of components that move relative to each other with the rotation of the plate, and
the play reduction part has a thickness greater than that of a part adjacent to the play reduction part in a direction along the relative movement of the pairs of components.

8. The seat rotating device according to claim 7, further comprising an engaging member to engage the pair of components with each other, wherein the play reduction part is provided at a part at which the engaging member is located when the plate is positioned at the predetermined rotating position.

* * * * *